United States Patent [19]

Gruenbaum et al.

[11] Patent Number: 4,711,832

[45] Date of Patent: Dec. 8, 1987

[54] COLORED ELECTROSCOPIC TONERS CONTAINING QUENCHED ESTERIFIED RHODAMINE DYES

[75] Inventors: William T. Gruenbaum; Julie P. Harmon; Luther C. Roberts, all of Rochester, N.Y.

[73] Assignee: Eastman Kodak Company, Rochester, N.Y.

[21] Appl. No.: 859,584

[22] Filed: May 5, 1986

[51] Int. Cl.$^4$ .......................... G03G 9/08; G03G 9/10
[52] U.S. Cl. .................................... 430/106; 430/965
[58] Field of Search ............................ 430/106, 965

[56] References Cited

U.S. PATENT DOCUMENTS 4,301,227  11/1981  Hotta et al. ......................... 430/106

FOREIGN PATENT DOCUMENTS 52-80839    7/1977   Japan .
57-130044   2/1981   Japan .
59-57256    4/1984   Japan .

Primary Examiner—Roland E. Martin
Attorney, Agent, or Firm—Bernard D. Wiese

[57] ABSTRACT

A colored, transparent electroscopic toner is provided comprising:
(a) a polymeric binder,
(b) a rhodamine dye having a non-lactonizing ester-containing phenyl group in the 9-position, and
(c) a quencher dye.

14 Claims, No Drawings

COLORED ELECTROSCOPIC TONERS CONTAINING QUENCHED ESTERIFIED RHODAMINE DYES

FIELD OF THE INVENTION

This invention relates to the field of electrography and in particular to colored electrographic toners.

BACKGROUND OF THE INVENTION

Electrography pertains to forming and utilizing latent electrostatic charge patterns to record and reproduce patterns in visible form. This field was pioneered by Chester F. Carlson when he disclosed in U.S. Pat. No. 2,297,681 the basic techniques of one major sector of the field, referred to as electrophotography. In the most commonly practiced form of electrophotography a photoconductive element is first given a uniform electrostatic charge over its entire surface. The element is then exposed to an image of actinic electromagnetic radiation such as light which selectively dissipates the charge in illuminated areas of the photoconductive element, while charge in the non-illuminated areas is retained, thus forming a latent electrostatic image.

The latent electrostatic image may then be developed or made visible by the deposition of finely divided electroscopic toner on the surface of the photoconductive element, as a result of which the toner conforms to the pattern of the latent electrostatic image. The visible image may be utilized in a number of diverse ways. For example, the image may be fixed in place on the photoconductive element or transferred to a second surface such as a sheet of paper and fixed in place. Likewise, the electrostatic charge pattern can be transferred to a second surface and developed there.

Another broad general branch of electrography is generally considered distinct from the electrophotographic branch in that it does not employ a photoconductive element and electromagnetic radiation to form its latent electrostatic image. This branch of electrography may generally be divided into two broad sectors which are generally referred to as xeroprinting and electrostatic or TESI recording (an acronym for the phrase "Transfer of Electrostatic Images").

Xeroprinting is considered to be the electrostatic analog of ordinary printing. The xeroprinting process, which is more fully described in U.S. Pat. No. 2,576,047 to Schaffert, employs a xeroprinting plate made up of a pattern of insulating material which is generally on a conductive backing so that when the xeroprinting plate is charged, as with a corona discharge electrode, an electrostatic charge pattern is retained only on the patterned insulating sections of the plate. This electrostatic image may then be developed with the same developing materials and techniques employed in developing electrophotographic images.

In electrostatic or TESI recording, the electrostatic charge patterns conforming to the desired reproduction are formed on a uniform insulating layer by means of an electrical discharge between two or more electrodes on opposite sides of the insulating medium. By controlling the shapes, combinations and numbers of electrodes employed, charge patterns of almost any shape may be formed on the insulating medium. Again, image development is by the same techniques as in electrophotography.

The common feature of all of these electrographic systems is that they employ the lines of force from an electric field to control the deposition of finely divided toner particles on a surface, thus forming an image with the toner particles. Although these systems are generally used for black and white reproduction, they are capable of forming images in either a single color or a combination of colors.

When a full color electrographic system is desired it is generally based on trichromatic color synthesis of either the additive or subtractive color formation types. Thus, when electrographic systems are operated in full color, toner or developing particles of at least three different colors must be employed to synthesize a desired color. As a rule, at least three color separation images are formed and combined in register with each other to form a colored reproduction of the original. Thus, in color xeroprinting or electrostatic recording at least three different latent electrostatic images must be formed, developed with different colored toners and combined to form the final image. The same is true of color electrophotography where at least three latent electrostatic images are formed by exposing a photoconductive element to different optical color separation images and developing each of these latent electrostatic images with a different colored toner, after which the three toner images are combined to form the final image.

In the systems described hereinbefore, the combination of the three color toner images may be provided on a receiver sheet such as paper, film, plastic or glass, to which the images are permanently fixed. The most common technique for fixing these toner images to the receiver sheet is by employing a thermoplastic polymeric toner which includes a colorant and heat fusing the toner images to the receiver sheet. The images may also be fixed by other techniques known in the art, such as subjecting them to a solvent vapor or by the use of a lacquer overcoat.

A toner employed in an electrographic color process must possess certain characteristics. For instance, the toner must be of the proper hue. In a typical substractive trichromatic process, combinations of magenta, cyan and yellow toners are used to produce images of their complementary colors: green, red and blue. Ideally, the absorption bands of the colored toners would be narrow, without extensive overlap, in order to allow production of saturated color images. Narrow absorption bands are especially desirable when a half-tone process is employed because half-tone imaging tends to broaden the reflection spectra due to scattering from the support to which the toner image is fixed, e.g. paper.

Further, there are certain other characteristics which are highly desirable for electrographic colorants. These characteristics include high extinction coefficient, stability to light, compatibility with the polymeric binder and transparency. A high extinction coefficient allows the use of less dye to obtain the desired color density. Light stability is important since fading can render the color image aesthetically undesirable. For example, Japanese Patent Application Publication (Kokai) No. 57-130044 discloses a toner comprising C.I. Solvent Red 49 (rhodamine free base) and C.I. Solvent Red 52 in a binder resin. Tests have shown (see comparison Example B, hereinafter) that toner of this type exhibits poor light stability; fading 30% in the green region of absorption spectra after 7 days exposure to high intensity daylight (HID).

Compatibility of the toner colorant and the polymeric binder is also important. Good dispersion of the colorant is essential to minimize unwanted light scatter since such scatter leads to broadening the reflectance spectrum of the colorant and to desaturation of the resultant hue. In addition, good dispersion results in maximum utilization of colorant which can be expressed as optical density obtained per gram of colorant employed. Adequate dispersion of insoluble particulate colorants is best achieved in binders with which they are compatible. The ultimate in compatibility is achieved with colorants which form solutions in the binder. Thus, colorants should be chosen which can be finely divided or dissolved in the toner binder to give maximum color saturation and colorant utilization.

A high degree of transparency of toner colorants avoids image degradation due to light scatter. Generally, prior art color electrographic systems operate by laying the color separation images on top of one another. In this system the toner images are superimposed and the toners must be sufficiently transparent so that no one of the three toner colors will scatter the light from the other different colored toner images. High color saturation and brightness are needed to satisfy the colorimetric requirements for three color synthesis of natural color images. The requirements of high transparency and good color saturation are extremely difficult to satisfy.

Japanese Patent Application Publication (Kokai) No. 52-80839 describes a toner comprising a magenta pigment obtained by treating a dye with phosphorus tungsten molybdate to form a so-called "lake pigment". The dye used to form the lake pigment has the formula:

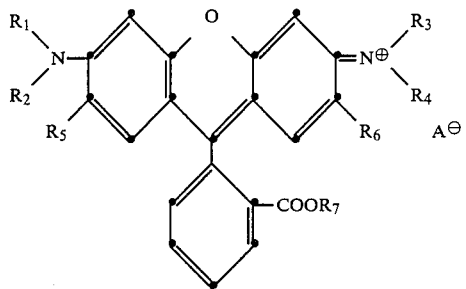

where each of $R_{1-7}$ is H or lower alkyl and $A^-$ is an anion. There is no indication in the Japanese Patent Application Publication that such a dye (not the lake pigment) could be used to form a magenta toner, and especially the magenta toner having the superior combination of characteristics described hereinafter.

SUMMARY OF THE INVENTION

A goal of the present invention was to formulate a magenta toner which possessed a number of characteristics which are very difficult to simultaneously maximize. The colorant used in the toner was to be of the proper hue with good color saturation and high extinction coefficient. It also was to be light stable, exhibiting minimal fade after extended exposure to light. In addition, the toner was to be highly transparent after fixing in order to function properly in an overlapping trichromatic system.

The difficulty of balancing these characteristics becomes apparent when one considers the characteristics of colorants in general. Dyes typically dissolve in polymeric binders and therefore form highly transparent toners. However dyes in general are not very light stable. On the other hand, pigments are generally light stable, but because they are typically dispersed in the toner binder rather than dissolved therein, they are not very transparent.

Rhodamine dyes are used as the toner colorant in the present invention because they possess high extinction coefficients and have narrow absorption bands. However the rhodamines are highly fluorescent, and their color is "reddish" rather than the desired magenta.

The problem of fluorescence was overcome by adding a fluorescence-quenching dye to the toner. Such a "fluorescence-quenching dye" or "quencher dye" is a dye which absorbs radiation at the same wavelengths that are emitted by the fluorescent dye that is being quenched. The addition of a quencher dye eliminates the rhodamine fluorescence and results in toners of the desired magenta hue. In addition the rhodamine/quencher dye-containing toners exhibit increased light stability.

The use of rhodamine esters rather than the rhodamine carboxylic acids offers several advantages. First, the rhodamine esters are more light-stable, as shown in comparison Example A. Second, the absorption spectra of the rhodamine esters are bathochromic to those of the corresponding rhodamine carboxylic acids. The bathochromic shift is highly desirable, providing less unwanted absorption of blue light and allowing the production of more highly saturated colors in a trichromatic system. In addition, the rhodamine esters appear to be more compatible with a variety of toner resins.

It has also been found that the selection of certain anions associated with the rhodamine esters provides an even further advantage for this invention in that it leads to an even greater improvement in light stability and solubility.

The above-mentioned improvements are combined in a colored electroscopic toner made up of finely divided, transparent polymer particles containing esterified rhodamine dye and a fluorescence-quenching dye. The particles are generally manufactured by uniformly blending the dyes in polymeric binder to form a solid solution of dye and polymer and then grinding this blend.

The toners of the present invention have been found to be relatively lightfast when compared to non-esterified or non-quenched rhodamine dyes. Additionally, the present toners possess high transparency and color saturation because the colorant is dissolved in the toner polymer.

DETAILED DESCRIPTION OF THE INVENTION

In accordance with the present invention, there is provided a colored electroscopic toner comprising:
(1) a polymeric binder,
(2) a rhodamine dye having a non-lactonizing ester-containing phenyl group in the 9-position, and
(3) a quencher dye.

Typically the esterified rhodamine dye has the structure:

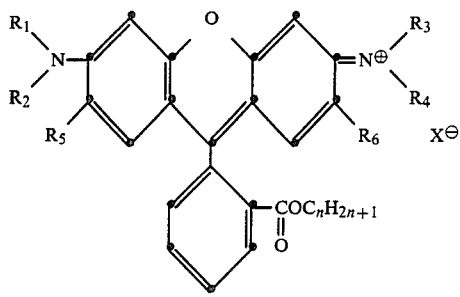

where each of $R^1$, $R^2$, $R^3$, $R^4$, $R^5$ and $R^6$ is H or an alkyl group, n is from 1 to 18 and $X^-$ is an anion.

A phenyl group is substituted at the 9-position of the substituted xanthene nucleus of the rhodamine dye. The phenyl group contains a non-lactonizing ester group, typically substituted at the ortho position. In one embodiment of the present invention, the non-lactonizing ester group is an ester of a monocarboxylic acid, often containing up to 19 carbon atoms. Typically, it is an ester of a lower monocarboxylic acid containing 1–8 carbon atoms, e.g., methoxycarbonyl, ethoxycarbonyl or propoxycarbonyl. The concentration of rhodamine dye used in practicing this invention is subject to wide variation. A typical concentration is about 1 to 10, often 2 to 5 weight percent, based on polymeric binder in the toner.

One advantage of the ionic esterified rhodamine dyes over zwitterionic rhodamine free bases, i.e., rhodamines which form neutral internal-salts, resides in the flexibility attained from the ability to select an anion $(X^-)$. The anion can be selected from a wide variety of anions, including trifluoromethanesulfonate $(CF_3SO_3^-)$, naphthalene disulfonate $(C_{10}H_8(SO_3)_2^=)$, para-toluenesulfonate $(H_3C-C_6H_5-SO_3^-)$, hexafluorophosphate $(PF_6^-)$, perchlorate $(ClO_4^-)$, meta-nitrobenzenesulfonate $(O_2N-C_6H_5-SO_3^-)$ and meta-aminobenzenesulfonate $(H_2N-C_6H_5-SO_3^-)$.

Fluorescence-quenching dyes useful in the practice of the present invention absorb radiation at the same wavelengths as the radiation that is emitted by the rhodamine dye used in the toner. The quencher dye is also light stable and transparent. Preferably the quencher dye is a pyridoanthrone dye, azo dye or anthraquinone dye. Specific examples of suitable dyes include Solvent Violet 14 (available from Morton Chemical, Chicago, Ill.), Sormagenta 5913 and Azo Dye 403294 (both available from Eastman Kodak Company, Rochester, N.Y.), Solvent Red 52 (available under the tradename Waxoline Rubine from ICI American, Wilmington, Del.) and Atlasol Violet JG (available from Atlantic Industries, Nutley, N.J.). Generally the quencher dye is present in a concentration of from about 0.05 to 0.3 wt % based on the polymeric binder in the toner. The quencher dye advantageously contributes to the stability of the fluorescent rhodamine dye. If the quencher dye is not light stable, it may have a deleterious effect on the light stability of the rhodamine/quencher dye combination, especially if the quencher dye is present in large amounts.

The polymeric binders useful in the practice of the present invention can be used alone or in combination and include polymers conventionally employed in electroscopic toners as long as the rhodamine and quencher dyes are compatible with the polymeric binder. The binder and dyes are considered completely compatible if the dyes dissolve in the binder and if the binder does not deleteriously affect the dyes. These binders can readily be determined through routine experimentation by those skilled in the art. Examples of polymers which may be employed in the toner particles of the present invention include polyesters such as those described in U.S. Pat. Nos. 3,590,000; 3,938,992; 4,140,644; 4,217,440; 4,252,921; Canadian Pat. No. 1,032,804 and U.K. Pat. No. 1,478,417. Certain polymers such as polystyrene and styrene butylacrylate copolymers are not normally used in the present invention because they provide rhodamine-containing toners that have lower light stability.

The toner particles of the present invention can be prepared by various methods. One convenient technique for preparing these toners is spray drying. Spray drying involves dissolving the polymeric binder and the dyes and any other desired addenda, e.g. charge-control agent, in a volatile organic solvent such as dichloromethane. This solution is then sprayed through an atomizing nozzle using a substantially nonreactive gas such as nitrogen as the atomizing agent. During atomization, the volatile solvent evaporates from the airborne droplets, producing toner particles of uniformly dyed polymer. The ultimate particle size is determined by varying the size of the atomizing nozzle and the pressure of the gaseous atomizing agent. Particles of a diameter between about 0.1 micrometer and about 100 micrometers may be used, although in general present day office copy devices typically employ particles between about 1.0 and 30 micrometers. However, larger particles or smaller particles can be used where desired for particular methods of development or particular development conditions. For example, in powder cloud development such as described in U.S. Pat. No. 2,691,345 issued Oct. 12, 1954, extremely small toner particles are used.

Another convenient method for preparing the toner composition of the present invention is melt blending. This technique involves melting a powdered form of polymer and mixing it with esterified rhodamine and quencher dye. The polymer can readily be melted on heated compounding rolls which are also useful to stir or otherwise blend the polymer and addenda so as to promote the complete intermixing of the various ingredients. The mixture is cooled and solidified after thorough blending. The resultant solid mass is then broken into small particles and finely ground to form a free flowing powder of toner particles. These particles typically have a median particle size or median diameter within the range of from about 0.1 to about 100 micrometers.

The toners of this invention can be mixed with a carrier vehicle to form developing compositions. The carrier vehicles which can be used with the present toners to form new developer compositions can be selected from a variety of materials. Suitable carrier vehicles useful in the invention include various nonmagnetic particles such as glass beads, crystals of inorganic salts such as sodium or potassium chloride, hard resin particles, and metal particles. In addition, magnetic carrier particles can be used in the invention. Suitable magnetic carrier particles are particles of ferromagnetic materials such as iron, ferrites, cobalt, nickel, and alloys and mixtures thereof. Other useful magnetic carriers are ferromagnetic particles overcoated with a thin layer of various film forming polymers, for example, alkali soluble carboxylated polymers. Other useful resin coated magnetic carrier particles include carrier particles coated with various fluorocarbons such as polytetrafluoroethylene, polyvinylidene fluoride, and mixtures thereof including copolymers of vinylidene fluoride and tetrafluoroethylene. The toners of this invention can also be used in single component developers.

The toner and developer compositions of this invention can be used in a variety of ways to develop electrostatic charge patterns or latent images. Such developable charge patterns can be prepared by a number of means and be carried for example, on a light sensitive photoconductive element or a non-light sensitive dielectric-surfaced element such as a receiver sheet. One suitable development technique involves cascading the developer composition across the electrostatic charge pattern, while another technique involves applying toner particles from a magnetic brush. This latter technique involves the use of a magnetically attractable carrier vehicle in forming the developer composition. After imagewise deposition of the toner particles, the image can be fixed by heating the toner to cause it to fuse to the substrate carrying the toner. If desired, the unfused image can be transferred to a receiver such as a sheet of paper and then fused to form a permanent image.

The invention will be further illustrated by reference to the following specific examples.

EXAMPLES

Preparation of Rhodamine 3B

The following illustrates how rhodamine 3B, i.e., the ethyl ester is prepared from rhodamine B, i.e., the carboxylic acid.

A 126 g (0.263 mole) sample of rhodamine B was stirred in a round bottom flask to dissolve in 2 liters of dichloromethane, and the red solution was stirred mechanically and treated with 63 milliliters (0.863 mole) of thionyl chloride, followed by 1 milliliter (0.013 mole) of dry dimethylformamide. The flask was immediately capped with a mineral oil bubbler and calcium sulfate drying tube and then gently heated to reflux with a steam bath, monitoring the gas evolution with the mineral oil bubbler, until no more gases were given off (4 hours). The mixture was allowed to cool, with stirring, to 25 C., and then treated with 630 milliliters of absolute ethanol. After allowing the mixture to stand overnight, it was concentrated under reduced pressure to give a viscous oil which was hand stirred under dry ether. The supernatant was decanted off and the process was repeated until the residue became nearly solid. Isolation and air drying gave 150 grams of damp solid. Drying overnight at 70° C. and 19 inches of Hg in a nitrogen flow gave 117 grams (88% yield) of olive crystalline solid, characterized by nuclear magnetic resonance (NMR) and infrared (IR) comparison with known samples of rhodamine 3B salt with perchlorate anion. The material isolated by the above procedure was used for the formation of other salts of rhodamine 3B without further purification.

Preparation of Rhodamine 3B with Trifluoromethanesulfonate (Triflate) Anion

A 10.0 g (0.0197 mole) sample of rhodamine 3B, prepared as described above, was dissolved in 200 milliliters of distilled water on a steam bath, suction-filtered, reheated, and treated hot with a solution of 0.040 mole of sodium triflate dissolved in distilled water. The sodium triflate was prepared by neutralizing 3.5 milliliters of trifluoromethanesulfonic acid with aqueous sodium hydroxide. The slurry of crystals was let cool and collected on a suction filter, washed with water, air dried overnight in an oven at 70° C., and 20 inches of Hg, with a nitrogen purge. The yield was 10.5 grams (86% yield) of olive green solid, which did not require further purification. The absorption spectrum in ethanol gave a molar absorptivity of 116,000 at 554 nanometers. The calculated and actual weight percentages found for carbon, hydrogen and nitrogen were:

Calcd. for $C_{31}H_{35}F_3N_2O_6S$: C, 60.0; H, 5.7; N, 4.5; S, 5.2. Found: C, 59.4; H, 5.7; N, 4.5; S, 5.5.

Spectral/Light Fade Test

The toners of the following examples were tested for light fade and their half peak height bandwidths were determined in the following manner.

Toned images were produced by manually applying the toner to a sample of Vintage Gloss Potlach paper, fusing the toner at 155° C. and ferrotyping the toner image by treatment with an Estar TM sheet (available from Eastman Kodak, Rochester, N.Y.) applied thereto at a slow speed and at a temperature of 155° C. The toned image exhibited a density of 1.0.

Total reflection spectral curves were recorded for the hand toned images and the bandwidth at half peak height was determined therefrom. In addition, light stability of the toned images was evaluated by measuring red, green and blue density shifts on a MacBeth densitometer with a Status D filter. Samples were measured before and after 7 days exposure to High Intensity Daylight (H.I.D.) at 50K lux or 3 weeks exposure to 16K lux fluorescent light.

EXAMPLES 1-3

The following examples illustrate the light stability and bandwidth of three toners of the present invention. The toners comprise:

(1) Poly[2-hydroxy-1,3-propylene-co-propylene glutarate-co-terephthalate (14:86)] binder having the structure:

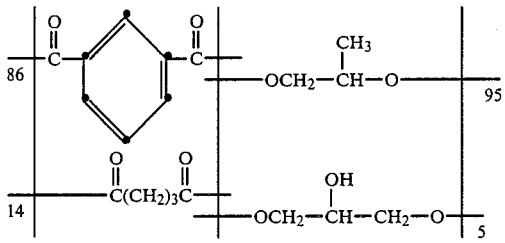

The numbers 86 and 14 represent the molar percentages of the monomers making up the diacid component and 95 and 5 represent the molar percentages of the monomers making up the diol component.

(2) Rhodamine propyl ester with triflate anion

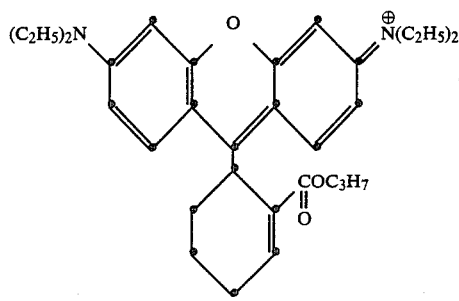

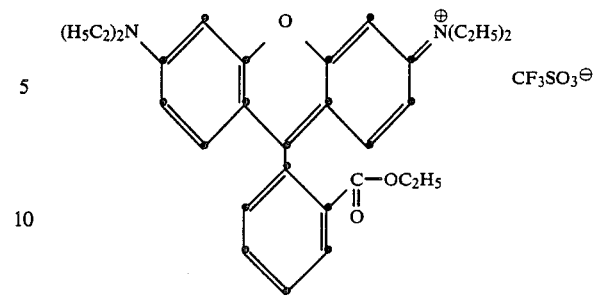

(3) Solvent Violet 14 quencher dye. (Also known as Morton Violet 14, available from Morton Chemical, Chicago, Ill.).

The rhodamine dye comprised 2% by weight of the binder. The amount of Solvent Violet 14 quencher dye was varied as listed in Table I. The resulting toners were separated into two groups. The first group was exposed to high intensity daylight (HID) for 7 days. The second group was exposed to 16K lux fluorescent light for 3 weeks. The change in density in the green region of the light spectrum is listed in Table I. The bandwidth at half peak height is also listed in Table I.

TABLE I

| Example | Wt. % Quencher | Green Density Change (%) 7 day HID | 3 wk 16K lux | Bandwidth (nanometers) |
|---|---|---|---|---|
| 1 | 0.05 | −8 | −7 | 83.7 |
| 2 | 0.15 | −5 | −5 | 85.8 |
| 3 | 0.25 | −3 | −3 | 83.9 |

The above "Green Density Change" fade data demonstrates that the toners are light stable. The narrow bandwidth shows that the toner gives minimal light scatter indicating that the dye is compatible with the binder polymer. In addition, differential charge patterns were developed with developers comprising the toners and satisfactory images were obtained, demonstrating that the toner is useful in electrographic processes and developer compositions.

EXAMPLES 4–7

The following examples illustrate the light stability and bandwidth of four toners of the present invention. The toners comprise:
(1) 20.0 grams of polyester binder (same polyester as in Example 1-3).
(2) 0.4 grams of Rhodamine 3B with triflate anion (3) Sormagenta 5913 Quencher Dye (available from Eastman Kodak Company, Rochester, N.Y.) present in various amounts, as listed in Table II.

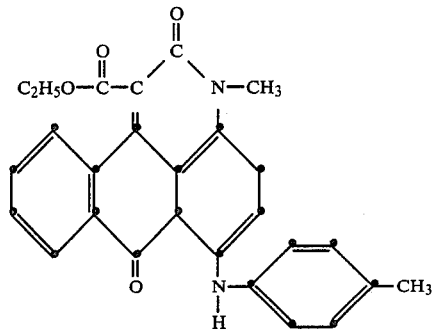

(4) 0.2 grams methyltriphenylphosphonium tosylate charge-control agent.

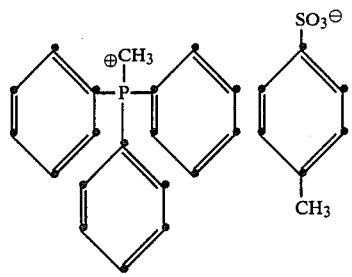

The toner was divided into two groups, the first group was exposed to HID for 7 days, the second to 16K lux fluorescent light. The change in density in the red, green and blue region is listed in Table II, as is the bandwidth.

TABLE II

| | | Density Change (%) | | | | | | |
|---|---|---|---|---|---|---|---|---|
| | Wt (g) | 7 days HID | | | 3 wks 16K lux | | | Bandwidth |
| Example | Quencher | Red | Green | Blue | Red | Green | Blue | (nanometers) |
| 4 | 0.01 | −5 | −12 | +3 | −4 | −10 | +2 | 90.6 |
| 5 | 0.05 | −9 | −19 | −1 | +1 | −5 | +4 | 82.2 |
| 6 | 0.08 | −7 | −22 | +1 | −1 | −6 | +4 | 91.5 |
| 7 | 0.12 | −8 | −26 | +2 | −6 | −15 | +1 | 93.3 |

The above data demonstrates that the above toner dye systems have acceptable light stability characteristics and narrow absorption bands. This data also demonstrates that at a sufficiently high quencher concentration the dye fade begins to increase.

EXAMPLES 8–11

The following examples illustrate toners of the present invention all comprising the same polymeric binder and quencher dye and in which the anion on the esterified rhodamine dye was varied. The toners comprise:
(1) The same polyester binder as in Examples 1–3.
(2) Rhodamine 3B with various anions, as listed in Table III.
(3) 0.05% Quencher Dye (Azo Dye 403294 available from Eastman Kodak, Rochester, N.Y.).

The light stability of the toners was measured as in the previous examples. The results are listed in Table III. The figures for change in density for Example 8 are the averages of several tests.

TABLE III

| | | Density Change (%) | | | | | |
| | | 7 days HID | | | 3 wks 16K lux | | |
| Example | Anion | Red | Green | Blue | Red | Green | Blue |
|---|---|---|---|---|---|---|---|
| 8 | ClO$_4^-$ | −1 | −20 | +4 | +1 | −16 | +1 |
| 9 | PF$_6^-$ | −1 | −6 | +4 | −2 | −5 | +4 |
| 10 | Cl$^-$ | −1 | −54 | +7 | −5 | −31 | +5 |
| 11 | CF$_3$SO$_3^-$ | −1 | −6 | +4 | −1 | −4 | 0 |

The above data demonstrates that the choice of anion influences the light stability of the toner/dye system.

COMPARISON EXAMPLE A

The following example compares the light stability of an esterified rhodamine dye of the type used in toners of the present invention with a non-esterified dye outside the scope of the invention. The esterified dye is rhodamine 3B with a triflate anion (R=C$_2$H$_5$ in Structure I below). The non-esterified dye is rhodamine B with triflate anion (R=H in Structure I below).

STRUCTURE I

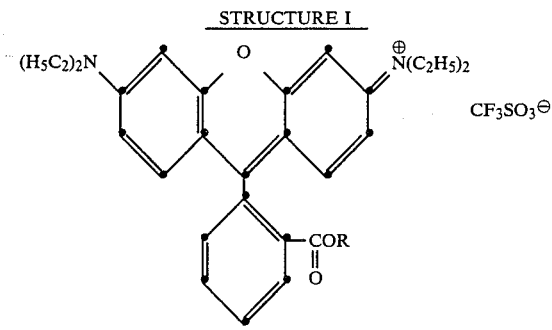

The triflate anion was chosen for this example because when other anions are substituted for the triflate anion the rhodamine B is typically rendered insoluble in polymeric binders. The samples were exposed to HID for 7 days or 16K lux fluorescent light for 3 weeks. The changes in density in the green region of the light spectrum are listed in Table IV.

TABLE IV

| | | Green Density Change (%) | |
| Example | Dye | 7 day HID | 3 wk 16K lux |
|---|---|---|---|
| A | Rhodamine B | −24 | −7 |
| 12 | Rhodamine 3B | −11 | −7 |

This comparison demonstrates that the esterified dye has superior light stability, when compared to a similar non-esterified rhodamine dye.

COMPARISON EXAMPLE B

The following example illustrates the light stability of a toner of the type disclosed in Japanese Patent Application Publication (Kokai) No. 57-130044 previously discussed herein. This toner comprises:
(1) Polymeric binder
(2) C.I. Solvent Red 49 (Rhodamine Free Base)
(3) C.I. Solvent Red 52 (Waxoline Rubine available from ICI Americas, Wilmington, Del.).

The toner was exposed to HID for 7 days or 16K lux fluorescent light for 3 weeks, as in the previous examples. The resulting change in density is listed in Table V.

TABLE V

| | Density Change (%) | | | | |
| 7 day HID | | | 3 wk 16K lux | | |
| Red | Green | Blue | Red | Green | Blue |
|---|---|---|---|---|---|
| +2 | −30 | +7 | +1 | −7 | +2 |

The 30% fade in green after HID exposure demonstrates the poor light stability of this toner/dye system.

COMPARISON EXAMPLE C

The following example compares toners of the present invention having rhodamine dye and quencher dye (Examples 13, 14 and 15) to toners having quencher dye, but no rhodamine dye (Comparison Examples C1, C2 and C3).

The quencher dyes used in this example are:
(I) Azo Dye 403294 (available from Eastman Kodak, Rochester, N.Y.)

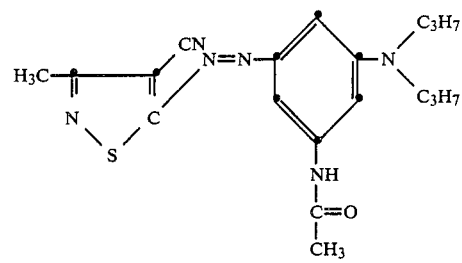

(II) Atlasol Violet JG (Solvent Violet available from Atlantic Industries, Nutley, N.J.)
(II) Solvent Red 52 (Waxoline Rubine available from ICI Americas, Wilmington, Del.).

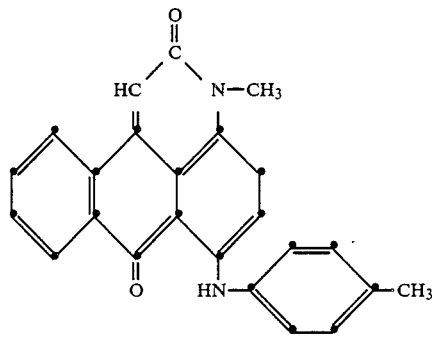

Toners C1, C2 and C3 comprise:
(1) The same polyester binder as in Examples 1–3.
(2) A Quencher Dye, as listed in Table VI.

Toners 13, 14 and 15 comprise:

(1) The same polyester binder as in Examples 1-3.
(2) Rhodamine propyl ester with triflate anion.
(3) A Quencher Dye, as listed in Table VI.

TABLE VI

| Example | Rhodamine propyl ester wt. % | Quencher Dye (wt. %) | Bandwidth (nanometers) |
|---------|------------------------------|----------------------|------------------------|
| C1      | 0                            | I (2)                | 116.0                  |
| 13      | 2                            | I (0.15)             | 77.1                   |
| C2      | 0                            | II (2)               | 122.3                  |
| 14      | 2                            | II (0.15)            | 81.9                   |
| C3      | 0                            | III (2)              | 130.3                  |
| 15      | 2                            | III (0.15)           | 80.3                   |

The above comparison demonstrates that the toners with both rhodamine dye and quencher dye have narrower half-peak absorption bandwidths than toners with quencher dye alone. Compositions having such wider bandwidths exhibit poor color saturation.

The invention has been described in detail with particular reference to preferred embodiments thereof, but it will be understood that variations and modifications can be effected within the spirit and scope of the invention.

What is claimed is:

1. An electroscopic toner comprising:
   (a) a compatible polymeric binder,
   (b) a rhodamine dye having a non-lactonizing ester-containing phenyl group in the 9-position, and
   (c) a fluorescence-quenching dye.

2. A toner as in claim 1 wherein the rhodamine dye has the structure:

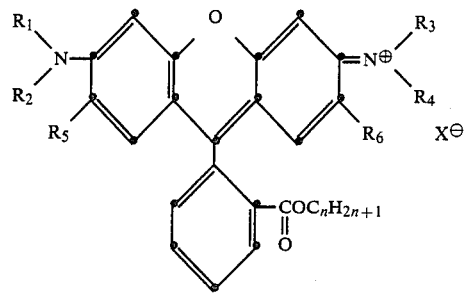

where each of $R^1$, $R^2$, $R^3$, $R^4$, $R^5$ and $R^6$ is H or an alkyl group, n is from 1 to 18 and $X^-$ is an anion.

3. A toner as in claim 2, wherein $X^-$ is trifluoromethanesulfonate, naphthalene disulfonate, para-toluenesulfonate, hexafluorophosphate, perchlorate, meta-nitrobenzenesulfonate or meta-aminobenzenesulfonate.

4. A toner as in claim 1, wherein the quenching dye is a pyridoanthrone dye, azo dye or an anthraquinone dye.

5. A toner as in claim 1, wherein the quenching dye is Solvent Violet 14, Sormagenta 5913, Azo dye 403294, Solvent Red 52 or Atlasol Violet JG.

6. A toner as in claim 1, wherein the polymeric binder is a polyester binder.

7. A toner as in claim 1, wherein the ester is a monocarboxylic acid ester.

8. A toner as in claim 2, wherein n is 2.

9. A toner as in claim 2, wherein n is 3.

10. A toner as in claim 1, wherein the ester substituent is in the ortho position on the phenyl group.

11. A toner as in claim 1, wherein the concentration of the quenching dye is from 0.05 to 0.3 weight percent, based on the polymeric binder.

12. An electrostatic developer composition comprising:
    (a) carrier particles, and
    (b) toner particles having the composition of claim 1.

13. A developer as in claim 12 wherein the toner particles have the composition of claim 2.

14. A developer as in claim 12 wherein the toner particles have the composition of claim 7.

* * * * *